(12) United States Patent
Fontanelli et al.

(10) Patent No.: US 10,804,208 B2
(45) Date of Patent: Oct. 13, 2020

(54) INTERPOSER FOR AN INTEGRATED SYSTEM AND CORRESPONDING DESIGN METHOD

(71) Applicant: MONOZUKURI S.p.A., Rome OT (IT)

(72) Inventors: Anna Adriana Fontanelli, Monza (IT); Davide Raccagni, Rome (IT)

(73) Assignee: MONOZUKURI S.P.A., Rome (IT)

( * ) Notice: Subject to any disclaimer, the term of this patent is extended or adjusted under 35 U.S.C. 154(b) by 19 days.

(21) Appl. No.: 16/053,148

(22) Filed: Aug. 2, 2018

(65) Prior Publication Data
US 2019/0043808 A1   Feb. 7, 2019

(30) Foreign Application Priority Data

Aug. 2, 2017  (IT) ........................ 102017000089251

(51) Int. Cl.
| | |
|---|---|
| *H01L 23/538* | (2006.01) |
| *H01L 25/065* | (2006.01) |
| *H01L 23/498* | (2006.01) |
| *H01L 21/48* | (2006.01) |
| *G06F 30/394* | (2020.01) |
| *H01L 23/50* | (2006.01) |
| *G06F 113/18* | (2020.01) |
| *H01L 23/00* | (2006.01) |

(52) U.S. Cl.
CPC ........ *H01L 23/5386* (2013.01); *G06F 30/394* (2020.01); *H01L 21/4846* (2013.01); *H01L 23/49838* (2013.01); *H01L 23/5384* (2013.01); *H01L 24/16* (2013.01); *H01L 25/0652* (2013.01); *G06F 2113/18* (2020.01); *H01L 23/50* (2013.01); *H01L 2224/16227* (2013.01); *H01L 2225/06513* (2013.01); *H01L 2225/06541* (2013.01)

(58) Field of Classification Search
CPC .................................................. H01L 23/5386
See application file for complete search history.

(56) References Cited

U.S. PATENT DOCUMENTS

| | | |
|---|---|---|
| 2011/0095418 A1 | 4/2011 | Lim et al. |
| 2013/0127053 A1 | 5/2013 | Park et al. |
| 2016/0172289 A1* | 6/2016 | Kung ............... H01L 23/49827 257/774 |

OTHER PUBLICATIONS

Search Report in application No. IT 201700089251, dated Apr. 24, 2018, 2 pages.

* cited by examiner

*Primary Examiner* — William A Harriston
(74) *Attorney, Agent, or Firm* — Hickman Palermo Becker Bingham LLP; Malgorzata A. Kulczycka

(57) ABSTRACT

An interposer for an integrated system comprises a plurality of first connecting members and a plurality of second connecting members to be electrically connected to each other and a contact area realizing an electric short circuit of a group of the first connecting members which are electrically equivalent or homologous transporting a same signal, the contact area being electrically connected with at least one of the second connecting members thus realizing a scrambling between a number of the first connecting members and a number of the second connecting members.

26 Claims, 9 Drawing Sheets

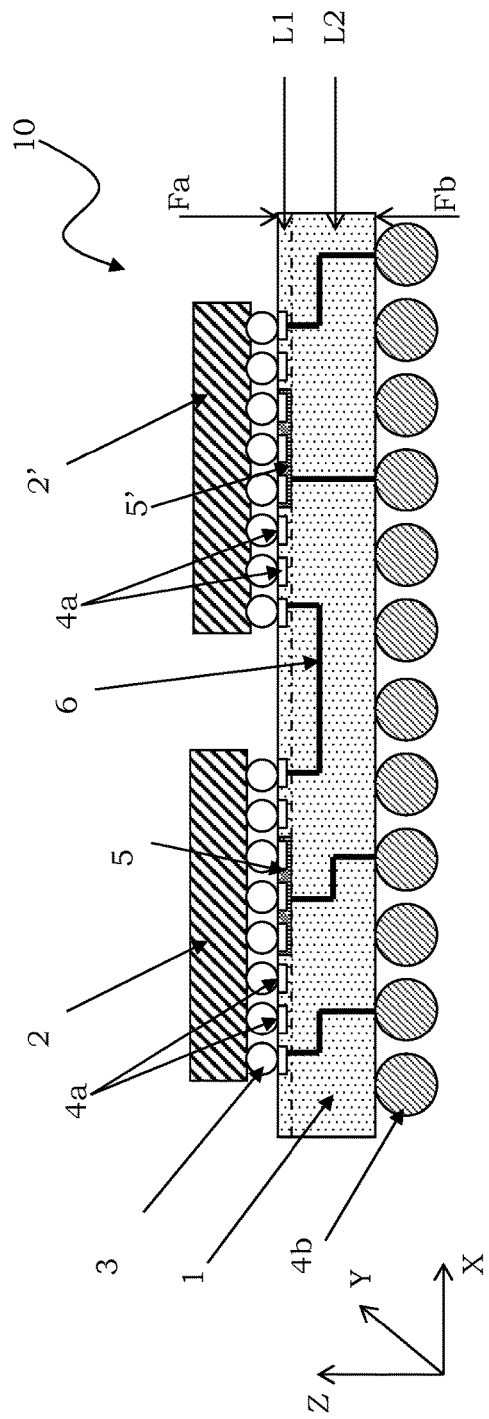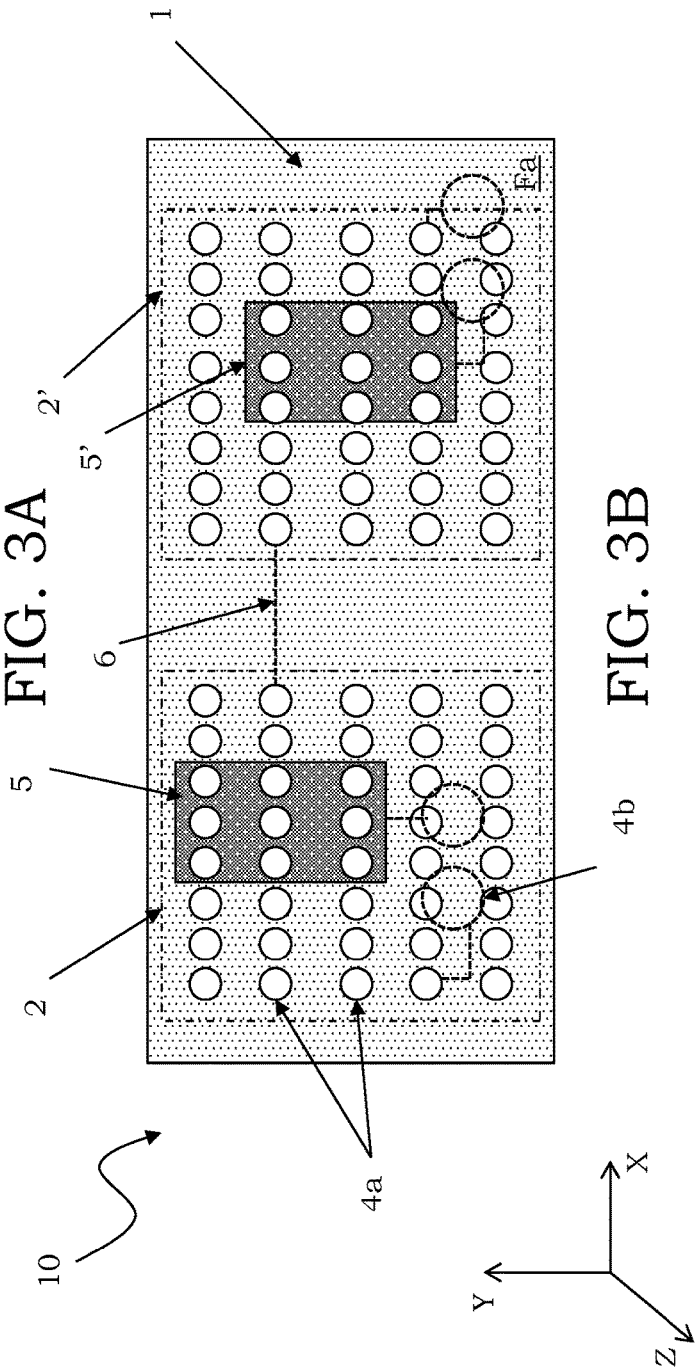
FIG. 3A
FIG. 3B

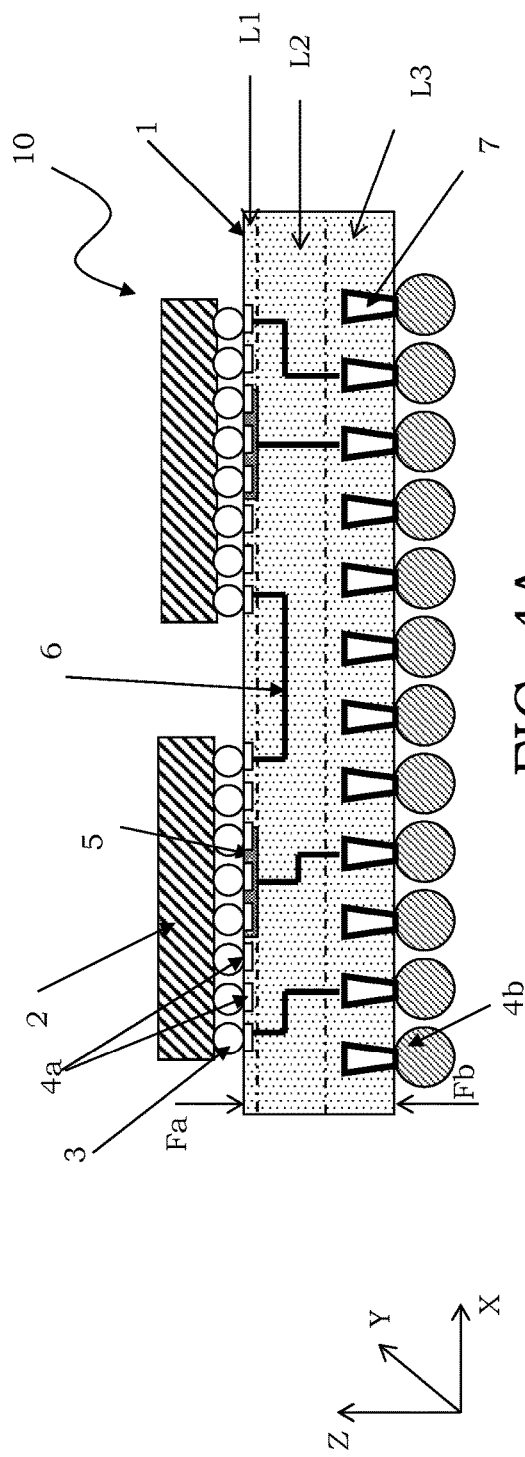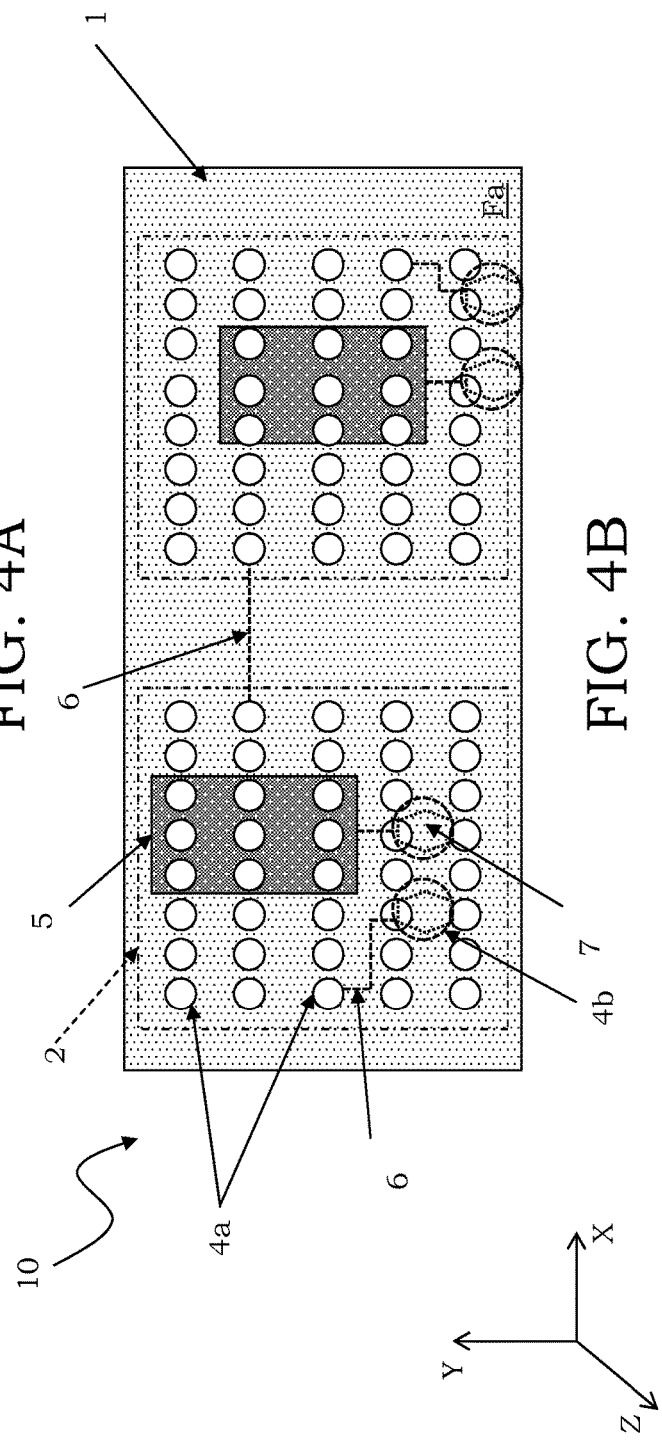

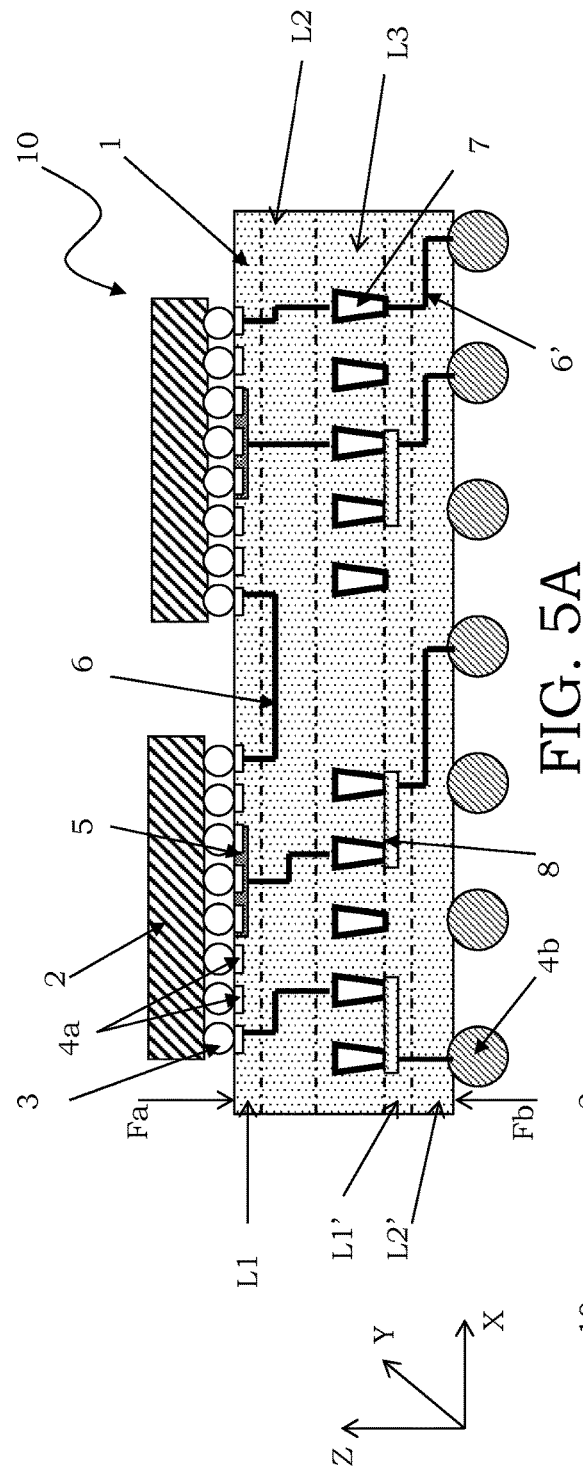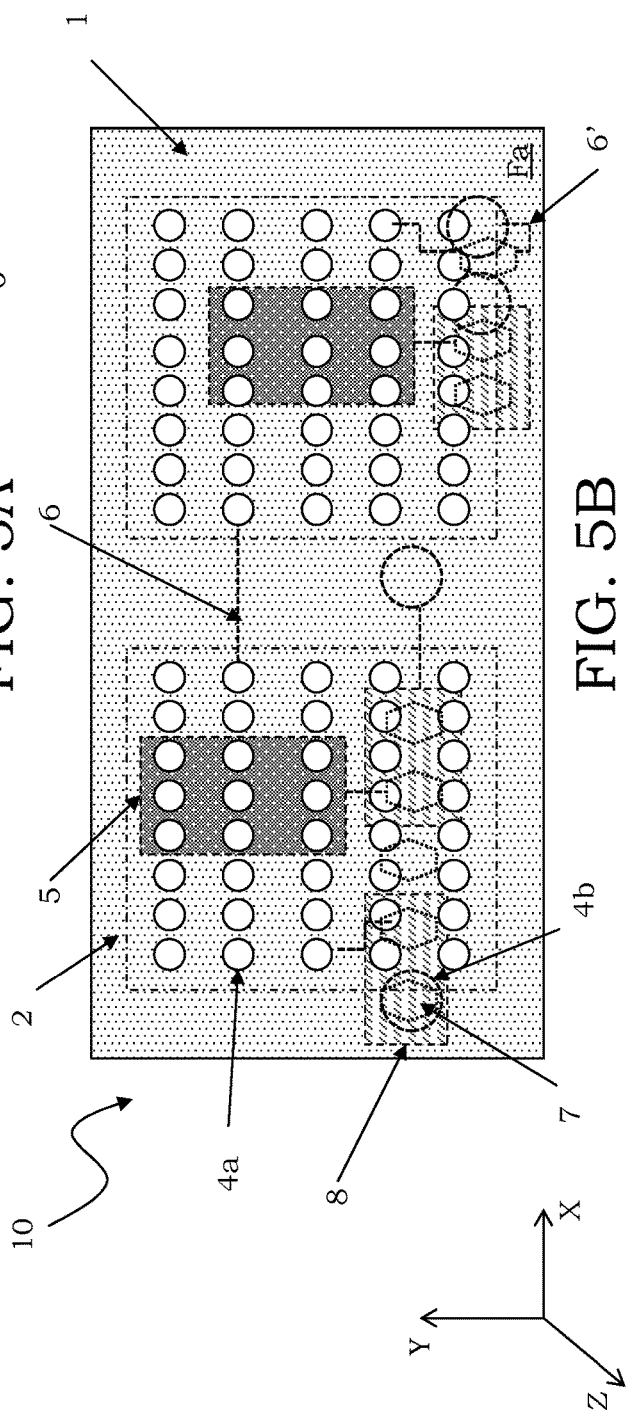

INTERPOSER FOR AN INTEGRATED SYSTEM AND CORRESPONDING DESIGN METHOD

PRIORITY CLAIM

This application claims the benefit under 35 U.S.C. § 119 of Italian patent application 102017000089251, filed Aug. 2, 2017, the entire contents of which are hereby incorporated by reference for all purposes as if fully set forth herein.

BACKGROUND

Technical Field

The present disclosure relates generally to an interposer for an integrated system and to the corresponding design method. Specifically, an embodiment of the disclosure relates to an interposer for a so-called 2.5D or 3D integrated system and the following description is done with reference to this field of application with the only aim of simplifying the exposition thereof.

Description of the Related Art

As it is well known, the field of semiconductor devices has been facing for several years market demands aimed at obtaining integrated circuits with a high number of functions and high performances.

In this perspective the so-called systems-on-chip (systems on integrated circuit) or SoCs have been developed, i.e. single integrated circuits or chips which comprise therewithin a real complex system, comprising for example a central processor or CPU, a memory module, for example a RAM memory, as well as all the circuitry attending to sort and direct the traffic of information between CPU and RAM memory, besides in case to other controllers of the input/output peripheral devices, to the input/output circuitry or to the video subsystem.

A SoC can contain in particular digital, analog components and radiofrequency circuits, the sole integrated circuit or chip which realizes it having reduced dimensions due to the integration of all the components thereof, which makes it adapted for example to embedded applications.

But the attempt to obtain an integration of a large number of functions involves an increase in the number of transistors to be realized on a single integrated circuit or chip, which collides with the requirements to realize such a chip with substantially the same dimensions as single-function circuits, if not even smaller, and with the complexity of managing the components used for the different functions in a sole chip.

The attention of the market was thus addressed to the so-called multi-chip modules or systems, i.e. to systems which comprise more interconnected integrated circuits or chips. In the systems, a plurality of single integrated circuits or chips which perform specific functions are interconnected in order to obtain a system capable of realizing more functions.

In this field the so-called Systems-in-Package or SiP systems are known, which comprise a plurality of integrated circuits or chips enclosed in a sole package. The chips are usually arranged on a common substrate of the package and are connected by bonding wires or by bumps, in the so-called flip-chip technology.

SiP systems, in particular when they realize a large number of functions and comprise a high number of single interconnected chips, appear however bulky, a large number of bumps outside the chips, which have, as it is well known, definitely problematic dimensions, having to be located on the package common substrate in the perspective of limiting the overall area occupied by the system, commonly indicated as circuit footprint.

In order to overcome this problem, 3D integrated systems have been thus proposed, which develop exactly in three dimensions, with an overall area or footprint similar to a single integrated circuit or chip. These systems comprise single integrated circuits, usually indicated as dies, overlapping each other starting from a semiconductor substrate and interconnected by openings filled with a conductive material or TSVs, acronym from "Through Silicon Vias", whose reduced dimensions improve the connections if compared with the long bonding wires of SiP systems.

However, the large-scale realization of the 3D integrated circuits currently appears not feasible, the configuration thereof being particularly difficult, in terms for example of realizing the interconnections between the various overlapping dies and of dissipating the heat generated therein.

The so-called 2.5D integrated systems are thus currently more widespread, comprising an interposer, in particular a passive element made of silicon, which is positioned between the single integrated circuits or dies and the package, the interposer realizing the interconnections between the different dies arranged thereon and being equipped in turn with TSVs and bumps for contacting the package. It is also possible to arrange on the interposer also stacks of integrated circuits or layers adapted to form for example a memory bank, in turn equipped with internal TSVs for the connection of the single layers.

The main advantage of a 2.5D integrated system, shared by 3D systems, consists however in the possibility of unpacking the functions required to the system itself and optimize the single dies, each realized with the most suitable technology, i.e. capable of ensuring the correct operation thereof, but also an acceptable yield so as to limit the costs thereof. In particular, when realizing a 2.5D integrated system, the single dies, as well as the interposer housing and connecting them, can be realized with proven technologies, even different from each other, which is obviously impossible for a SoC which is realized with the most extreme technology among those required to realize the most problematic component thereof.

In a 2.5D integrated system, the single dies can be realized in particular by different manufacturers, individually specialized for a determined function, and then interconnected to form the 2.5D integrated system in the desired final shape and with the desired functions.

It is further suitable to underline that the interposer of such a 2.5D integrated system, for example made of silicon, is capable of simply realizing and ensuring in time a correct connection between the dies it houses, by using proven technologies such as those of the integrated circuits and with good yields, which is impossible in the case of SiP systems and of the connection realized at the package level. In particular, inside the interposer connections are provided by metal tracks or also TSVs, adapted to connect the connecting members of the single dies, in particular microbumps, with connecting members or bumps of the interposer itself and thus, through a package substrate, with connecting members of the package itself, or package ball.

Also by using the 2.5D integrated systems, especially in the most recent and extreme applications such as those required by telecommunications, it comes to face the problems linked to the requirement to ensure the correct connection of a very high number of connecting members of the single dies as well as the reduction in number, or scrambling, thereof down to a reasonable number of connecting members for the containment package of such a system, i.e. consistent with the number of package balls currently realizable at the package level at an acceptable cost for the consumer world.

All these problems make the design of the 2.5D integrated systems extremely complex, both in terms of positioning the single dies on the interposer, and especially in terms of realizing the electric connections between the dies and the external world, through the interposer and the containment package of the system as a whole. The design of the 2.5D integrated systems further appears modifiable only by providing high efforts, in terms of time and costs, each modification of the single dies, in particular of the signals carried by the connecting members or microbumps thereof, reflecting on the configuration of the interposer and also on the connection with the package.

BRIEF SUMMARY

An embodiment of the present disclosure provides an interposer for an integrated system comprising at least one integrated circuit or die, having such structural and functional features overcoming the limitations and the drawbacks still affecting the systems realized according to the prior art, in particular by optimizing the management of the scrambling, i.e. their reduction in number, between the connecting members of the single dies of the system and the ones of the interposer itself in a simple and easily-reconfigurable way.

According to another embodiment at least one conductive contact area is realized in the interposer, being adapted to short circuit a plurality or group of connecting members connected at the contact area, the connecting members being electrically equivalent, in particular transporting a same signal, the contact area thus realizing a scrambling, i.e. a reduction in number, of the connecting members of the interposer itself, in particular the number of the connecting members which contact opposite faces thereof.

More specifically, the interposer for an integrated system comprising respective pluralities of first and second connecting members to be electrically connected to each other, comprises at least one contact area adapted to realize an electric short circuit of a group of the first connecting members, the first connecting members of the group being electrically equivalent or homologous transporting a same signal, the at least one contact area being electrically connected with at least one of the second connecting members so as to realize a scrambling between a number of the first connecting members and a number of the second connecting members.

According to a further aspect, the disclosure relates to an integrated system comprising at least one die and one interposer as defined above, adapted to house the at least one die.

Finally, yet another embodiment of the disclosure further relates to a design method for designing an interposer for an integrated system comprising respective pluralities of first and second connecting members intended to be electrically connected to each other, the method comprising the steps of:
analyzing an arrangement at least of the first connecting members of the interposer;
identifying one or more groups of the first electrically equivalent or homologous connecting members transporting a same signal;
realizing at least one contact area at at least one of the groups of the first connecting members, the at least one contact area realizing a short circuit of the first connecting members of the group; and
providing at least one electric connection of the at least one contact area with at least one of the second connecting members, so as to realize a scrambling between a number of the first connecting members and a number of the second connecting members.

BRIEF DESCRIPTION OF THE SEVERAL VIEWS OF THE DRAWINGS

The features and advantages of the interposer for an integrated system and of the corresponding design method comprising at least one integrated circuit or die according to the disclosure will be apparent from the following description of an embodiment thereof given by way of non-limiting example with reference to the attached drawings.

In the drawings:

FIGS. 3A-3B, 4A-4B and 5A-5B: are respective schematic vertical cross-sectional and above plan views of alternative embodiments of the integrated system comprising the interposer realized according to the present disclosure;

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1B:
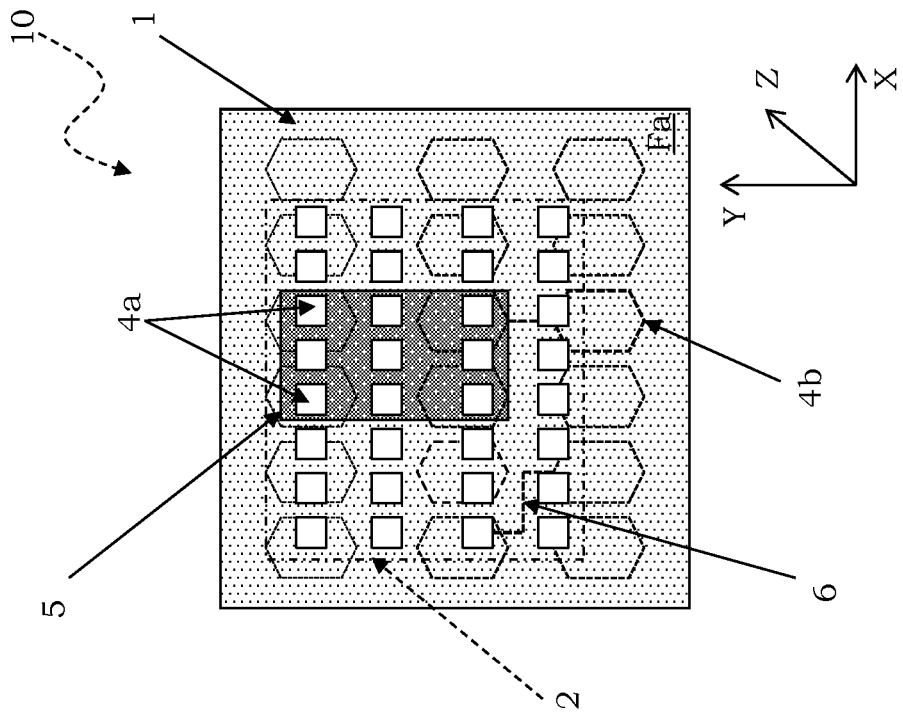
FIGS. 1A and 1B: are respective schematic vertical cross-sectional and above plan views of an interposer realized according an embodiment of to the present disclosure.
Figure 1A:
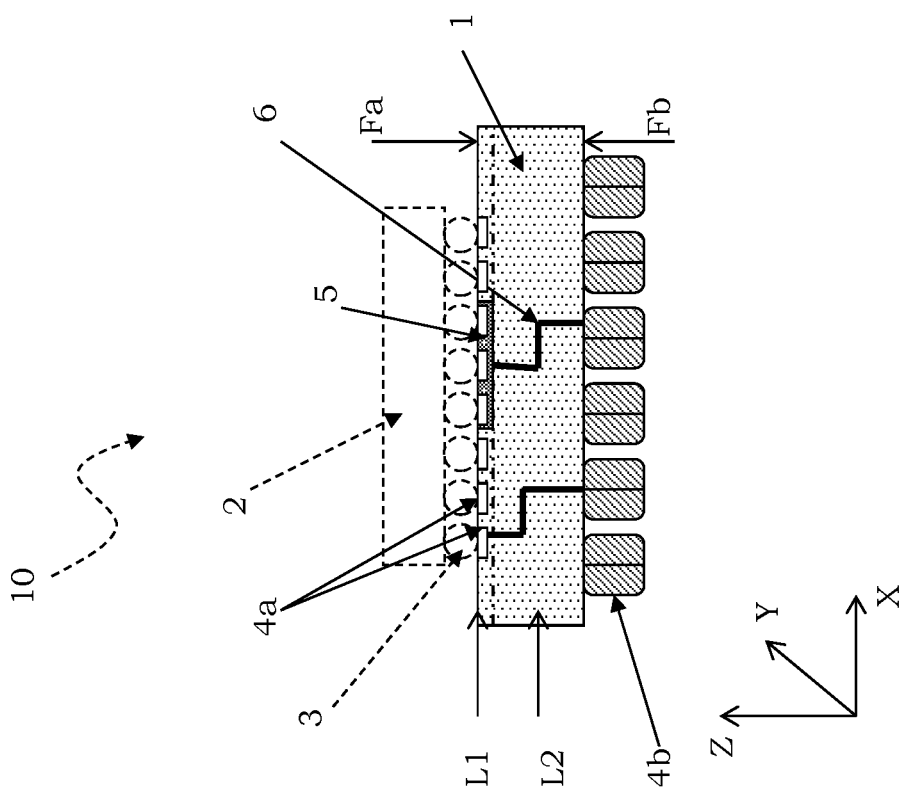

Referring to FIG. 1A, an interposer realized according to an embodiment of the present disclosure is globally and schematically indicated with 1. In particular, the interposer 1 is for an integrated system 10 and adapted to house at least one integrated circuit or die 2 equipped with a plurality of end connecting members, in particular microbumps 3, adapted to come into contact, in particular into electric contact, with the interposer 1.

It should be noted that the figures are schematic views of the system and of the interposer according to embodiments the disclosure and are not drawn to scale, but they are instead drawn so as to emphasize the important features of the embodiments.

Moreover, the different aspects of the disclosure represented by way of example in the figures can be obviously combined to each other and interchanged from an embodiment to another.

More particularly, the interposer 1 comprises a first plurality of connecting members, in particular contact pads 4a realized at a first face Fa thereof, in particular an upper face in the local reference of FIG. 1A and a second plurality of connecting members, in particular bumps 4b, projecting from a second face Fb thereof, distinct and opposite to the first face Fa, in particular a lower face in the local reference of FIG. 1A.

The interposer 1 further comprises suitable internal conductive paths, or routing metal tracks 6, adapted to connect the contact pads 4a with the bumps 4b.

In the more general form of application thereof, the contact pads 4a are in electric contact with the microbumps 3 of the die(s) 2 housed on the interposer 1, realizing an electric contact inside the integrated system 10 which comprises it while the bumps 4b are adapted to connect the interposer 1, and thus the integrated system 10, with an external world, such as for example a containment package of the integrated system 10 as a whole.

Essentially, the contact pads 4a are realized on the first face Fa of the interposer 1 in a specular way to the microbumps 3 of all the dies 2 which are to be housed thereon inside the integrated system 10.

Suitably, the interposer 1 according to an embodiment of the present disclosure further comprises at least one contact area 5 made of a conductive material capable of electrically short-circuiting a plurality of connecting members; in particular, in the example of FIG. 1A, the contact area 5 contacts a group of contact pads 4a. More particularly, the contact area 5 is realized at the first face Fa of the interposer 1 at the contact pads 4a.

Alternatively, the contact area 5 can be made of a suitably doped semiconductor material.

The interposer 1 further comprises suitable routing metal tracks 6 capable of getting also the contact area 5 into contact with a respective bump 4b of the interposer 1 itself.

In general, the bumps 4b of the interposer 1 are also the connecting members of the integrated system 10 which comprises the interposer 1.

Suitably, the connecting members or contact pads 4a at the contact area 5 and thus short-circuited to each other are electrically equivalent or homologous connecting members, i.e. which are intended to transport a same signal. For example it is possible to identify a group of contact pads 4a intended to transport a ground signal or a power signal; it is in fact well known that these signals are usually transported by a multiplicity of connecting members or microbumps 3 in each die 2, which are usually grouped so as to contact adjacent contact pads 4a. It is however possible to realize the contact area 5 at contact pads 4a adapted to transport a same signal distinct from ground and power signals.

Obviously, also the microbumps 3 intended to rest on the electrically equivalent or homologous contact pads 4a are in turn electrically equivalent or homologous, this definition being used indifferently with reference to contact pads 4a and microbumps 3.

It is suitable to point out that the presence of the contact area 5 allows the management of the connectivity inside the interposer 1 to be simplified and in particular it allows a scrambling, i.e. a reduction in number, to be effected between the contact pads 4a and thus the microbumps 3 of the die 2 and the bumps 4b of the interposer 1. For example, in the case of one contact area 5 capable of short-circuiting nine contact pads 4a, as illustrated for example in FIG. 1B, the scrambling realized is of 9:1. In a preferred embodiment, the contact area 5 is realized with a shape and dimensions adapted to minimize a surface occupancy while ensuring the contact of all the contact pads 4a of the identified group of electrically equivalent or homologous connecting members, the shape and dimensions being identifiable due to known mathematical rules.

In fact it should be reminded that the interposer 1 has respective pluralities of connecting members realized on the opposite faces thereof having number and dimensions definitely different from each other, since the first face Fa of the interposer 1 interfaces with the "world of integrated circuits" i.e. with the microbumps 3 of dies 2, which are in greater number, in particular much greater, even much greater than the number of the bumps 4b realized on the second and opposite face Fb thereof, which interfaces with an external world, for example the "world of packages". In that case, the integrated system 10 comprising the interposer 1 is encapsulated in a containment package, the package being equipped in turn with an even lower number of connecting members, in particular much lower, than the number of connecting members or bumps 4b to the interposer 1, as it will be clarified below.

In other words, the contact pads 4a realized on the first face Fa of the interposer 1 are in greater number, or better much greater, than the number of bumps 4b realized on the second face Fb thereof and the interposer 1 according to an embodiment of the present disclosure is advantageously capable of effecting the scrambling therebetween, i.e. of reducing the number of the bumps 4b if compared with the number of the contact pads 4a with a ratio depending on the contact area 5.

It is also usual that the dimensions of the contact pads 4a and of the microbumps 3 in contact thereon are lower than the corresponding dimensions of the bumps 4b, in particular with reference to a maximum transverse dimension thereof, for example a diameter thereof in the simplest case of sphere-shaped bumps, so as to be compatible with the different technologies for manufacturing the integrated circuits and the interposer, respectively. In other words, the contact pads 4a and the microbumps 3 have a lower maximum transverse dimension or diameter, in particular much lower, than a maximum transverse dimension or diameter of the bumps 4b, the contact pads 4a thus having a lower area occupancy, in particular much lower, on the first face Fa of the interposer 1 if compared with an area occupancy of the bumps 4b on the second face Fb thereof.

Suitably, the interposer 1 equipped with the contact area 5 is thus adapted to realize the connections of a large-sized die 2, with a high number of microbumps 3 in contact with a high number of contact pads 4a realized on the first face Fa of the interposer 1 and it is capable of reducing the corresponding number of bumps 4b which is realized on the second face Fb thereof and intended to contact the package, i.e. of simply realizing a scrambling between contact pads 4a (equal to the number of microbumps 3) and bumps 4b.

It is obviously possible to repeat the above-explained scrambling mechanism by using more than one interposer in cascade, for example in case the reduction in the number of bumps realized due to a single interposer is not sufficient to reach a desired final number of bumps as designed. This repetition of the scrambling mechanism can thus overcome technological limits for realizing the interposer, for example constraints linked to the dimensions of the TSVs and of the required diaphragms separating them, which limit the maximum number of TSVs being realizable in an interposer and thus of the scrambling factor obtainable with a single interposer.

Furthermore, it is emphasized that, suitably according to the embodiments of the present disclosure, shape and dimensions of the contact area 5 can be selected on the basis of technological requirements or of the desired, in case prefixed, scrambling. In general, the contact area 5 can have shape and dimensions not free but bound by the technology used to realize the interposer 1, with subsequent imposition of the maximum number of connecting members i.e. contact pads 4a (and thus of the microbumps 3) which can be contained therein, number linked in particular to the dimensions and arrangement of the contact pads 4a. Alternatively, the contact area 5 can have shape and dimensions calculated starting from the dimensions and arrangement of the connecting members or contact pads 4a (and thus of the microbumps 3) based on a scrambling ratio predetermined by a designer, for example 9:1, i.e. each contact area 5 comprises nine contact pads 4a able to contact nine microbumps 3 and connected to a single bump 4b due to a routing metal track 6 which connects the bump 4b to the contact area 5.

If a plurality of contact areas 5 are present, they can have identical or dissimilar dimensions and shape, according to the design requirements of the interposer 1 and in general of the integrated system 10 which comprises it, in particular essentially linked to the groups of electrically equivalent connecting members of the dies 2 housed on the interposer 1.

Obviously, the shape and dimensions of the contact pads 4a and of the bumps 4b as well as the shape and dimensions of the contact area 5 illustrated in the figures are completely arbitrary, and any shape or dimension can be selected, compatibly with the overall dimensions of the interposer 1 and of the integrated system 10 to be realized.

In the example of FIG. 1B, by only way of indication, the contact pads 4a have a substantially square shape while the bumps 4b have a parallelepiped shape, with a hexagonal base. Moreover, as illustrated in FIG. 1A, the microbumps 3 have an essentially spherical shape and dimensions adapted to contact the contact pads 4a.

In a preferred embodiment, the contact area 5 has a substantially rectangular shape, as illustrated in FIG. 1B, particularly adapted to the current integrated circuit architectures which usually comprise electrically equivalent or homologous contact pads 4a, for example adapted to transport a ground signal, grouped according to regular patterns and thus easily contactable by a substantially rectangular or trapezoidal area; nothing prevents one contact area 5 of a circular, oval or unregular shape from being used, based on the technological requirements or on the arrangement of the electrically equivalent or homologous contact pads 4a that are to be short-circuited.

As indicated, it is also possible to realize in the interposer 1 a plurality of contact areas 5 at different groups of electrically equivalent or homologous contact pads 4a. The contact areas 5 can be equal or different in shape and dimensions, realizing equal or different scramblings between contact pads 4a and bumps 4b.

It is emphasized that it is generally possible to identify inside the interposer 1 distinct functional levels, and in particular: a first level of scrambling L1, comprising the contact area(s) 5 and a second level of routing L2 comprising the routing metal tracks 6, as indicated in FIG. 1B. The levels normally correspond to distinct portions of the interposer 1, but it is not essentially so.

Figure 2A:
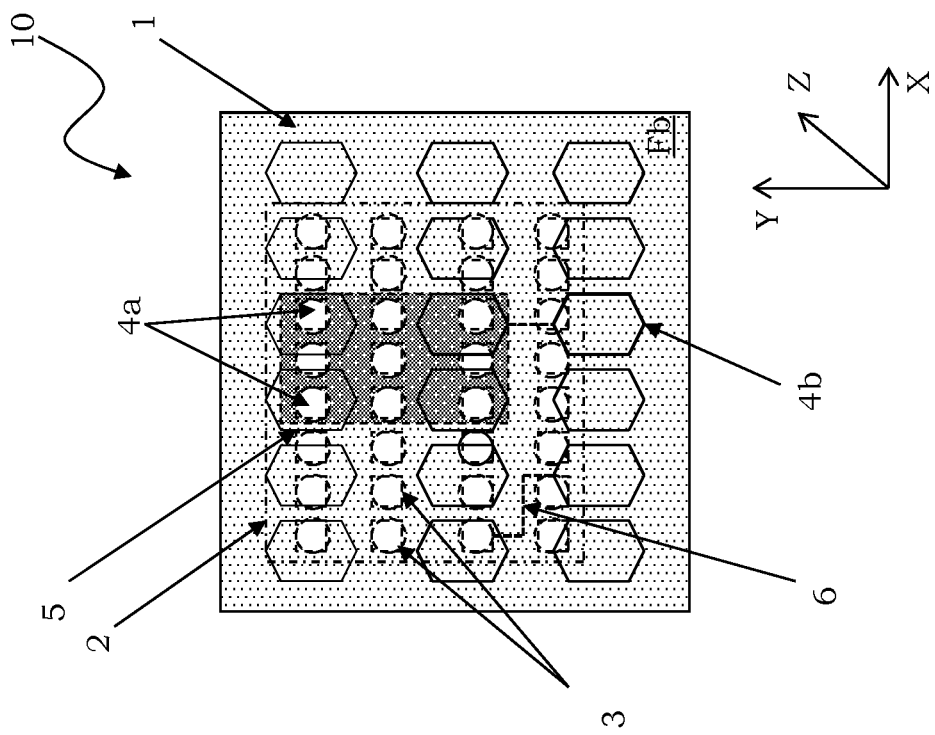
FIGS. 2A and 2B: are respective schematic vertical cross-sectional and below plan views of an integrated system comprising the interposer of FIGS. 1A and 1B.
Figure 2B:
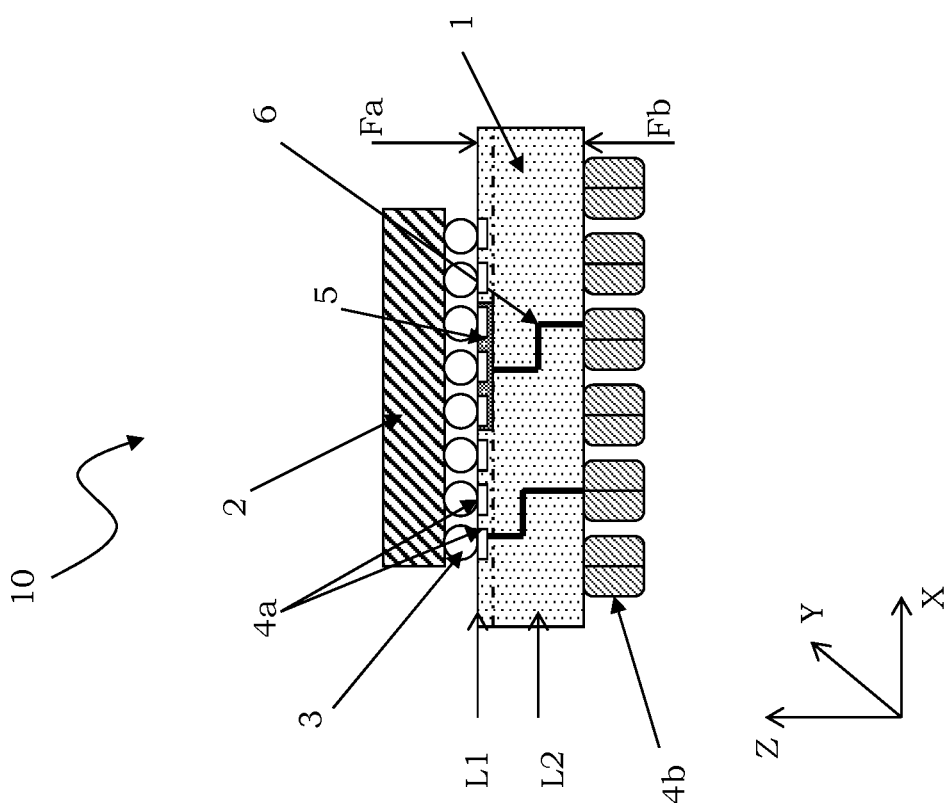

An integrated system 10 comprising a die 2 housed on the interposer 1 was illustrated in FIGS. 2A and 2B according to a configuration similar to the one of FIGS. 1A and 1B.

In normal applications, the integrated system 10 comprises in particular a plurality of dies housed on and connected by the interposer 1, in the form of a multi-die integrated system. Such a multi-die integrated system 10 is schematically illustrated in FIGS. 3A and 3B, only two dies 2 and 2' being illustrated for simplicity of exposition, the dies being in any number, only limited by the overall dimensions desired for the final integrated system 10. It is emphasized that FIG. 3B is an above plan view of the interposer 1, thus at the first face Fa thereof, without the presence of the dies 2, 2' and with circular-shaped contact pads 4a, the underlying structures being schematically indicated in broken lines and described only where useful for understanding the disclosure.

The interposer 1 can comprise in that case one or more contact areas 5 at the die 2 and/or one or more contact areas 5' at the other die 2'. Moreover, the routing metal tracks 6 can also be used for the direct connection between contact pads 4a intended to contact microbumps 3 of the die 2 and of the die 2', respectively, besides for the connection of a contact pad 4a with a corresponding bump 4b or for the connection of one contact area 5 or 5' still with a corresponding bump 4b of the interposer 1.

In that case too, it is possible to identify inside the interposer 1 a first level of scrambling L1 comprising the contact area(s) 5, 5' and a second level of routing L2 comprising the routing metal tracks 6.

The interposer 1 can also comprise, besides the routing metal tracks 6, also connections of the TSV type (acronym from the: "Through Silicon Via"), indicated as TSVs 7 in FIGS. 4A and 4B. FIG. 4B is an above plan view of the interposer 1, thus at the first face Fa thereof, without the presence of the dies, the underlying structures being schematically indicated in broken lines and described only where useful for understanding the disclosure.

The TSVs 7 are usually realized at and in contact with the bumps 4b and are connected, by the routing metal tracks 6, to the contact pads 4a or to the contact areas 5. In that case it is possible to identify inside the interposer 1 the following levels: the first level of scrambling L1 comprising the contact area(s) 5, the second level of routing L2 comprising the routing metal tracks 6 and a third level of connection L3 by the TSVs 7.

Also the TSVs 7 are to be considered as connecting members of the interposer 1, in that case realized therewithin as the routing metal tracks 6.

Although not illustrated in the figures, the TSVs 7 could also not be in direct contact with the bumps 4b but connected thereto by additional metal tracks.

Moreover, the shape and dimensions of the TSVs 7 are completely arbitrary.

Suitably according to an embodiment of the present disclosure, the interposer 1 can also comprise additional contact areas 8 realized at a plurality of TSVs 7, as schematically illustrated in FIGS. 5A and 5B, the latter being a view similar to FIGS. 2B, 3B and 4B.

As above, the additional contact areas 8 are adapted to short-circuit a group of TSVs 7 and they thus realize an additional scrambling between the TSVs 7 and the bumps 4*b*. The interposer 1 further comprises additional routing metal tracks 6', adapted to connect the additional contact areas 8 with the bumps 4*b*. In particular, also the additional contact areas 8 are realized at groups of electrically equivalent or homologous TSVs 7. The additional contact areas 8 can be equal or different in shape and dimensions, realizing equal or different scramblings between TSVs 7 and bumps 4*b*.

In that case it is possible to identify inside the interposer 1, besides the first level of scrambling L1 comprising the contact area(s) 5, the second level of routing L2 comprising the routing metal tracks 6 and the third level of connection L3 by the TSVs 7, also an additional level of scrambling L1' comprising the additional contact areas 8 and an additional level of routing L2' comprising the additional routing metal tracks 6'.

Figure 6:
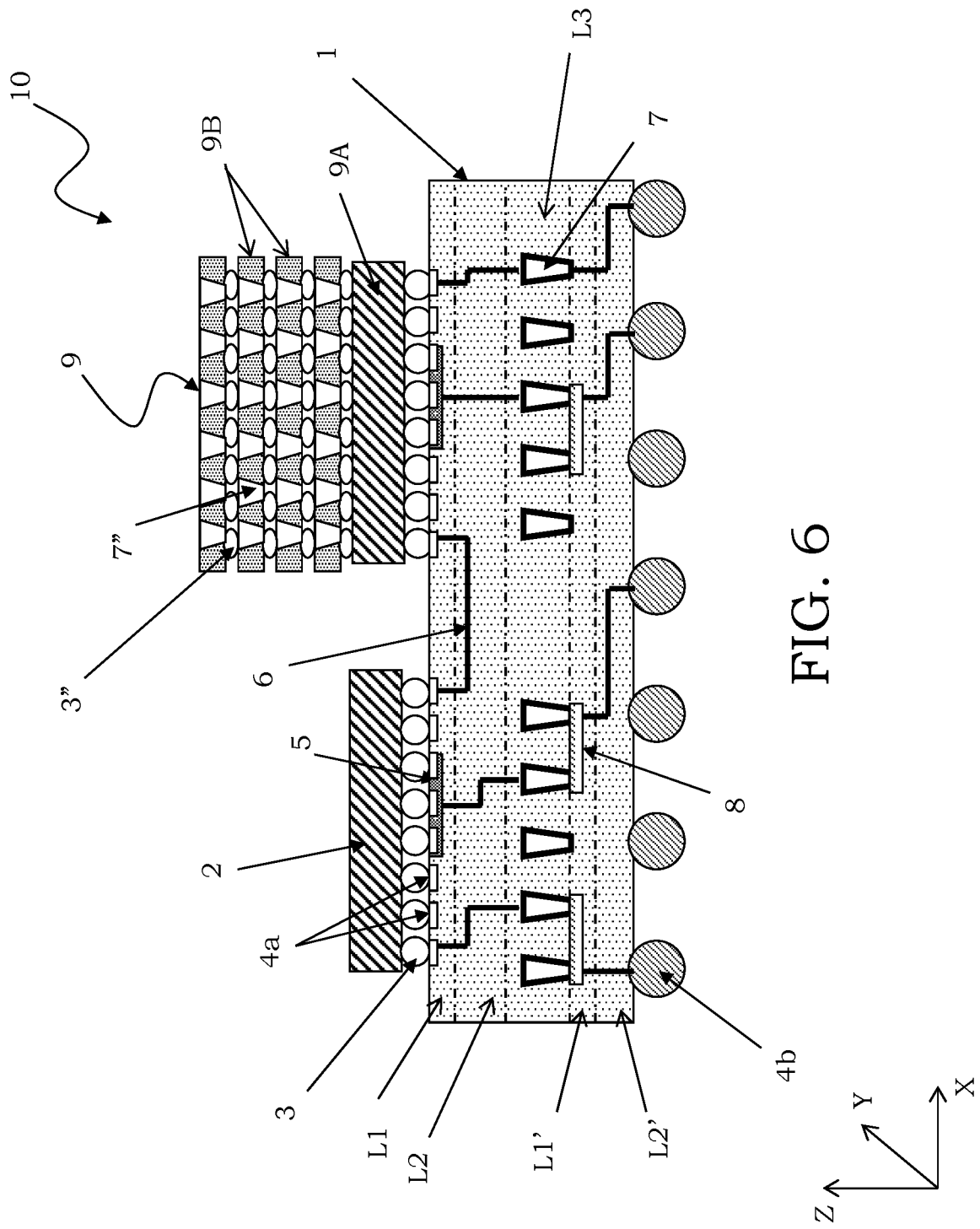
FIG. 6: is a schematic vertical cross-sectional view of an integrated system equipped with at least one memory stack and comprising the interposer realized according to an embodiment of the present disclosure.

In an alternative embodiment, schematically illustrated in FIG. 6, the integrated system 10 comprises a memory bank 9, including in turn a controller 9A equipped with a plurality of microbumps 3 in contact with a plurality of contact pads 4*a* of the interposer 1 and a stack of dies 9B, overlapping to each other and connected to each other by additional microbumps 3" and additional TSVs 7". The stack of dies 9B is usually indicated as a memory stack and the controller 9A as a memory controller.

As above, the interposer 1 comprises one or more contact areas 5 realized at the memory bank 9 and adapted to realize a scrambling of the contact pads 4*a* and thus of the microbumps 3 of the controller 9A thereof, as explained above with regard to the other embodiments, the controller 9A being equivalent to a die, which is though suitably connected to the stack of dies 9B to realize the memory bank 9. In the exemplary embodiment of FIG. 6, the interposer 1 also comprises TSVs 7 and additional contact areas 8 as the one of FIG. 5B, by only way of illustration, an interposer 1 only equipped with the contact areas 5 and the routing metal tracks 6 as the one illustrated in FIGS. 1A, 2A and 3A or only with the TSVs 7 as the one illustrated in FIG. 4A. In that case too, the contact areas 5 are realized at different groups of contact pads 4*a* and thus microbumps 3 of the controller 9A of the memory bank 9 being electrically equivalent or homologous.

Figure 7:
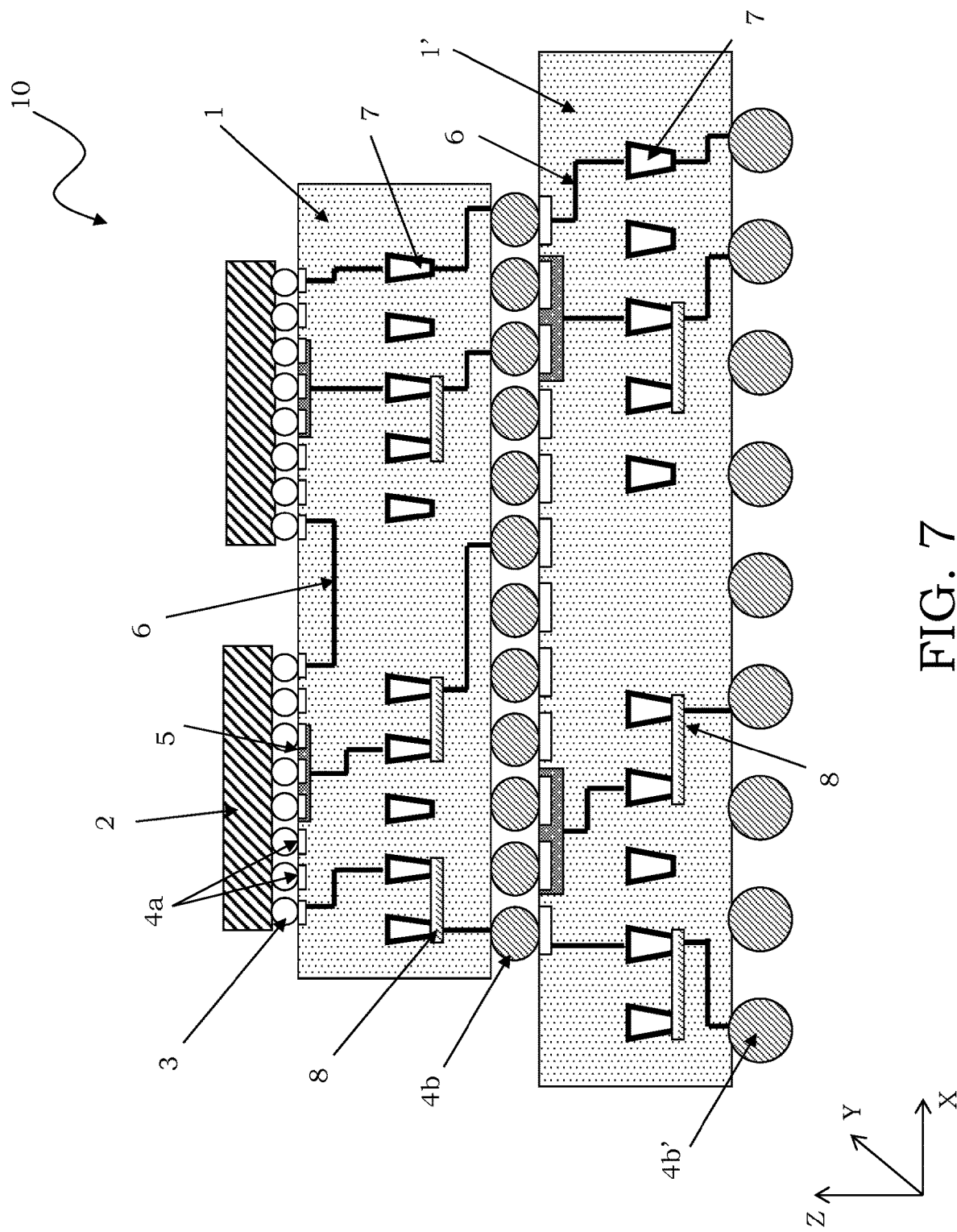
FIG. 7: is a schematic vertical cross-sectional view of an alternative embodiment of an integrated system comprising a plurality of interposers realized according to the present disclosure.

According to a further alternative embodiment, the integrated system 10 comprises a plurality of interposers 1, each adapted to realize a scrambling. By way of illustration, an integrated system 10 comprising an interposer 1 and an additional interposer 1' is illustrated in FIG. 7, adapted to realize distinct scramblings of the connecting members realized on the opposite faces thereof, in particular between contact pads 4*a* or microbumps 3 and bumps 4*b*, 4*b'*, of the dies 2 and of the interposers 1, 1' themselves. Thereby it is possible to reduce the number of the connecting members going from the dies, to the interposer 1 and thus to the additional interposer 1', the connecting members being further allowed to have gradually increasing dimensions, as schematically illustrated in the figure.

Figure 8:
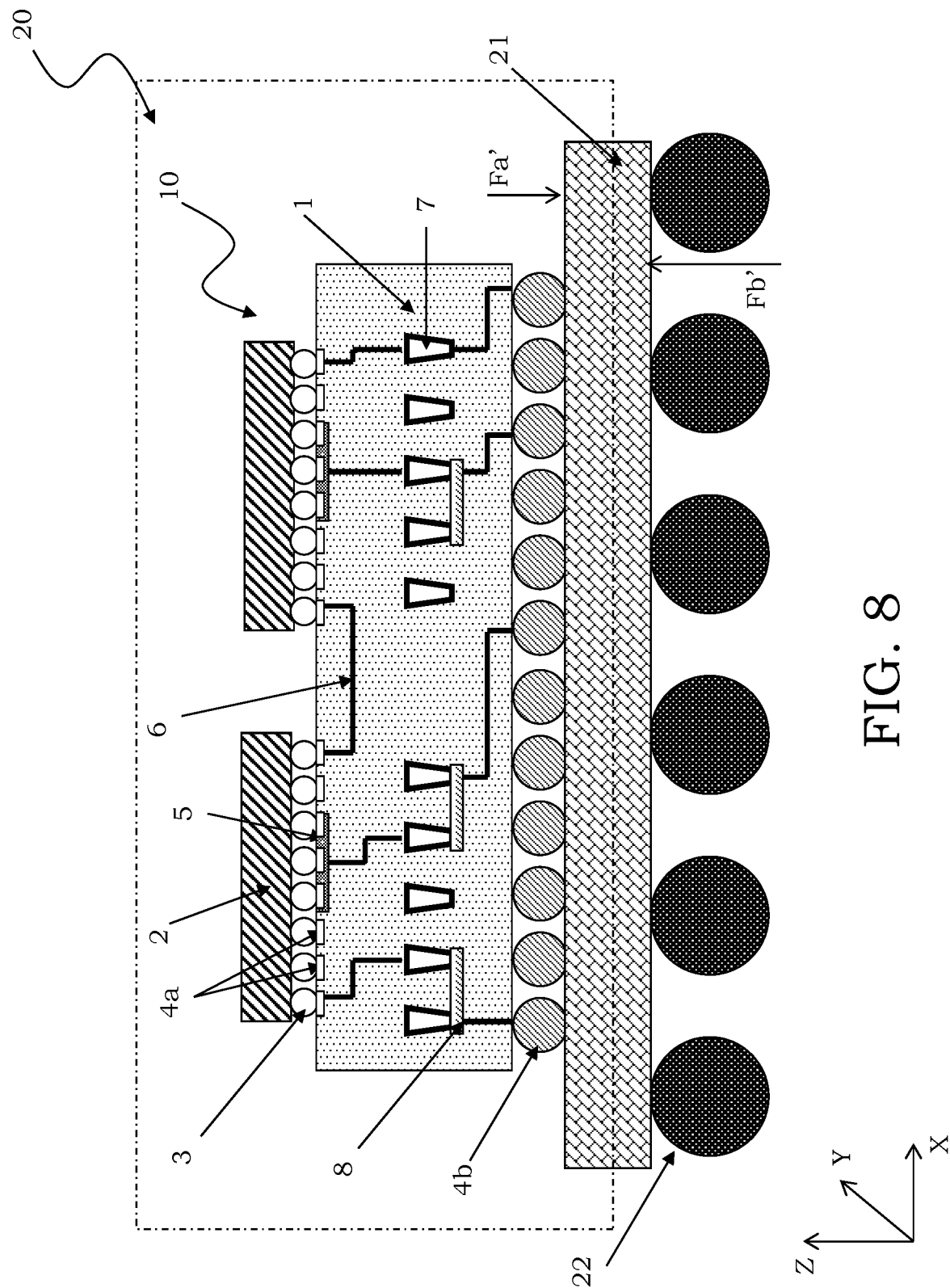
FIG. 8: is a schematic vertical cross-sectional view of an integrated system comprising the interposer realized according to the present disclosure and mounted on a package substrate.

Furthermore, the integrated system 10 can be encapsulated in a suitable package 20, as schematically illustrated in FIG. 8. In particular, the package 20 comprises a package substrate 21 which houses the integrated system 10 and is equipped in turn with suitable connecting members or balls 22, such as BGA ball.

More particularly, the bumps 4*b* of the interposer 1 of the integrated system 10 are in contact with a first face Fa' of the package substrate 21, in particular an upper face in the local reference of FIG. 8, the balls 22 projecting from a second face Fb' thereof, distinct and opposite to the first face Fa', in particular a lower face in the local reference of FIG. 8.

Although not illustrated in FIG. 8, also the package substrate 21 can comprise contact pads realized at the bumps 4*b* of the interposer 1 of the integrated system 10 encapsulated therein.

Figure 9:
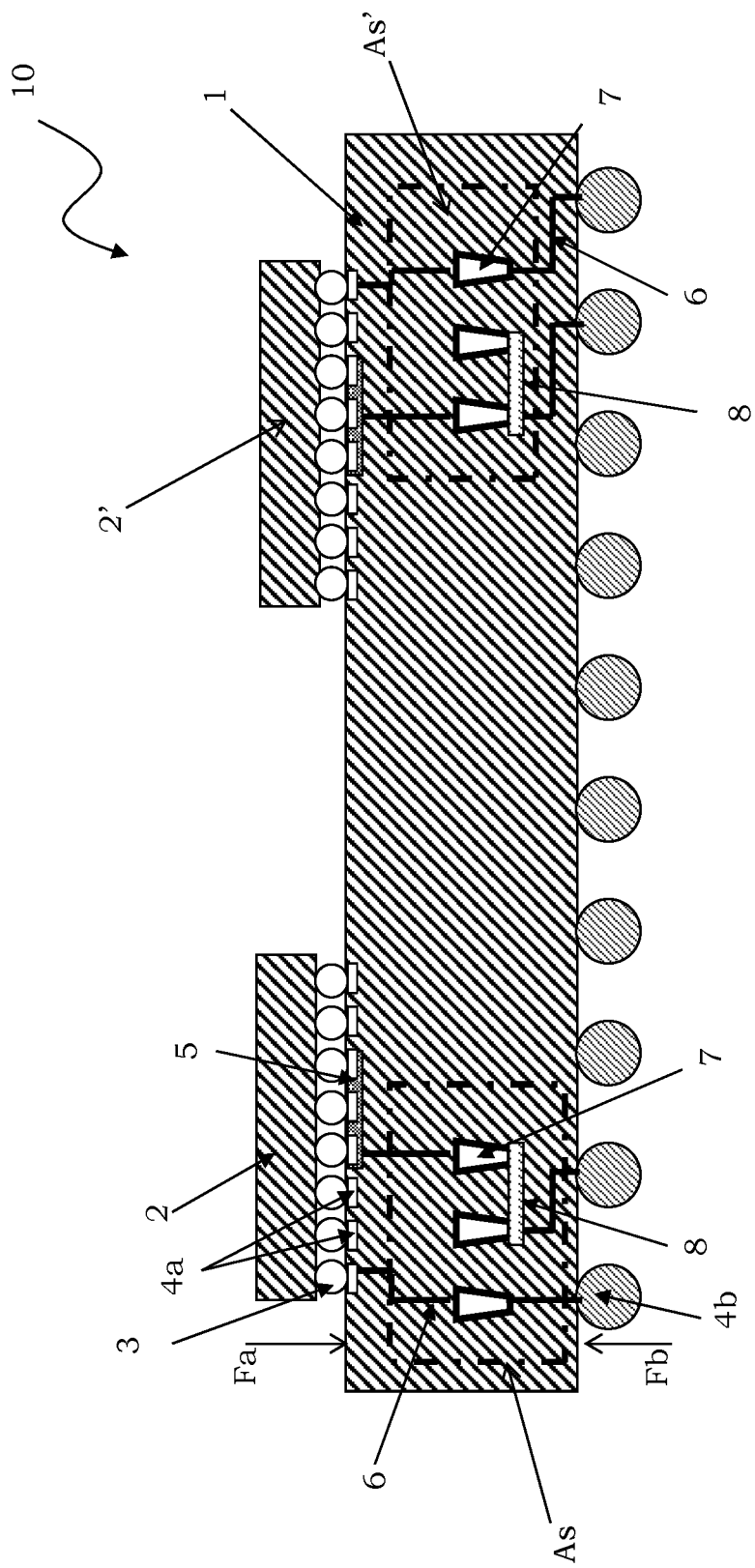
FIG. 9: is a schematic vertical cross-sectional view of a further alternative embodiment of an integrated system comprising an interposer realized according to the present disclosure, the interposer itself being a die.

According to a further alternative embodiment schematically illustrated in FIG. 9, the integrated system 10 comprises an interposer 1 which is in turn a real die and in which portions free from active circuitry are left to allow the TSVs 7 and the metal tracks 6 to be realized, for the connection with at least one die housed on the interposer. In the example of FIG. 9 given by way of illustrative and non-limiting example, the interposer 1 comprises at least one first scrambling area As for the connection with a first die 2 and one second scrambling area As' for the connection with a second die 2' housed thereon; in particular, all the contact areas and the metal tracks of the levels of scrambling required for the integrated system 10 are realized in the scrambling areas As, As'.

Obviously, the integrated system 10 can comprise additional interposers in cascade, as illustrated for example in FIG. 7, and these additional interposers can be real dies themselves.

Alternatively, according to a non-illustrated alternative, the interposer 1, made particularly of a semiconductor material, preferably of silicon, can comprise an additional integrated circuitry capable of providing additional functionalities, such as for example a filtering of undesirable noise, besides managing the connections inside the interposer itself.

The present disclosure also relates to a design method for designing the interposer 1 capable of optimizing the management of the connectivity that the interposer realizes between the connecting members of the at least one die housed therein or of connecting members inside the interposer 1 such as the TSVs 7 outwards, ensuring in particular a correct scrambling of the number of the connecting members themselves. External means in that case any additional electric component which does not belong to the integrated system 10 comprising the interposer 1 and the dies 2, in particular a package substrate adapted to contain the integrated system 10 itself, as it will be clarified in the description below.

In the most general embodiment thereof, the design method for designing the interposer 1 comprises the steps of:

analyzing the arrangement of the first and second connecting members of the interposer 1;

identifying one or more groups of first connecting members being electrically equivalent or homologous which are to be short-circuited;

realizing at least one contact area at at least one of the groups of first connecting members, the contact area realizing the desired short circuit of the first connecting members of the group; and providing at least an electric connection of the contact area with at least one of the second connecting members, so as to realize a scrambling between the number of the first connecting members and the number of the second connecting members.

In particular, as described above, the contact area 5, 8 can be used to short-circuit a group of microbumps 3 adapted to abut thereon, but also a group of TSVs 7 realized inside the interposer 1.

The method further comprises a step of assigning the connections to be made between the contact pads 4a and the contact area(s) 5, 8 of the interposer 1 and the bumps 4b thereof, so as to realize the desired scrambling. As explained above, the above-indicated method steps can be repeated for more than one interposer, cascade-connected to each other, as illustrated for example in FIG. 7, in the case in which a sole interposer is not capable of reducing the number of bumps to the value desired by design specifications.

Suitably, the step of assigning assigns to the bumps 4b a respective signal between those transported by the single contact pads 4a or by the groups of contact pads 4a short-circuited by the contact areas 5 and it allows a subsequent realization of the routing metal tracks 6 to be arranged.

It is emphasized that the step of assigning the signals to the different bumps 4b is comprised in the so-called step of global routing, belonging to the design of the interposer 1 and preliminary to the following step of physically realizing the routing metal tracks 6.

Suitably, the step of assigning comprises a step of minimizing the lengths of the connections and the number of the intersections between them, with identification of an optimum bump 4b.

More particularly, the step of assigning uses suitable cost functions to decrease the congestion of the connectivity of the interposer 1.

Preferably, the cost functions are determined on the basis of the graph theory serving to find minimum ways or paths on weighted graphs, more preferably a hierarchical optimization algorithm or Cross hierarchical optimization, which takes into account all the levels of the system 10 as a whole.

In a preferred embodiment, the step of minimizing can be:
of the concurrent type, so as to identify the n shortest paths simultaneously; or
of the sequential type, with optimization of a path at a time.

Suitably, the method can further comprise a step of defining the shape and dimensions of the contact area 5 in order to occupy a minimum surface while ensuring the contact with all the connecting members of the group, for example contact pads 4a intended to contact microbumps 3 of a die 2 adapted to be housed on the interposer 1.

In a preferred embodiment, the step of defining comprises defining the contact area 5 with a rectangular or trapezoidal shape.

In general, the step of defining the contact areas 5, 8 comprises a step of:
generating a contact area 5, 8 with a shape and dimensions bound by the technology used to realize the interposer 1, with subsequent imposition of a maximum number of first connecting members, i.e. contact pads 4a or TSVs 7, which can be contained therein, linked in particular to the dimensions and arrangement of the contact pads 4a or TSVs 7; or
generating a contact area 5, 8 with a shape and dimensions calculated starting from the dimensions and arrangement of the connecting members contained therein, in particular contact pads 4a or TSVs 7, based on a scrambling ratio predetermined by a designer, for example 9:1, i.e. each contact area 5, 8 comprises nine connecting members, contact pads 4a or TSVs 7, connected to a single connecting element or bump 4b of the interposer 1 outwards.

Suitably, the above-indicated steps of the design method can be repeated for more than one interposer in cascade, in particular when the scrambling factor obtainable with a single interposer is not sufficient for the desired application.

In conclusion, the interposer for an integrated system, particularly a multi-chip system, according to the embodiments of the disclosure allows an effective scrambling to be realized between the number of connecting members which contact the opposite faces thereof thanks to the realization of one or more contact areas capable of short-circuiting connecting members in contact, particularly in electric contact therewith.

Suitably, contact areas are realized at groups of connecting members being electrically equivalent or homologous, in particular adapted to transport a same signal, such as contact pads in contact with microbumps of dies housed on the interposer or TSVs realized therein.

Thereby, the interposer is for example adapted to realize connections of a high number of connecting members, belonging to one or more dies, reducing the corresponding number of connecting members of the interposer outwards, in particular towards a containment package of the integrated system comprising the interposer and die.

It is also possible to use the interposer to realize a system equipped with a single die, using it for example as an interface member between a package and a die already designed, so as to realize the correct readdressing of the corresponding microbumps and bumps, according to the so-called "package reuse" design flow.

Finally, in the case of interposers made of a semiconductor material, it is suitably possible to realize therein also a real integrated circuitry, for example capable of providing additional functionalities, such as a filtering of undesirable noise, besides managing the connections inside the interposer itself.

Obviously, a person skilled in the art, in order to meet contingent and specific requirements, will be able to bring several modifications and alternatives to the above-described interposer, all falling within the scope of protection of the disclosure as defined by the following claims.

It is possible for example to consider a plurality of contact areas realized at different levels inside the interposer, separated or in cascade to each other, so as to realize a multiplicity of levels of scrambling within a sole interposer.

Finally, although usually made of a semiconductor material, particularly silicon, the interposer according to the present disclosure can be also made of a different semiconductor material, such as germanium, or of other materials, such as ceramic materials or materials usually used for printed circuits or PCBs.

From the foregoing it will be appreciated that, although specific embodiments of the disclosure have been described herein for purposes of illustration, various modifications may be made without deviating from the spirit and scope of the disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An interposer for an integrated system comprising:
   a plurality of first connecting members and a plurality of second connecting members to be electrically connected to each other;
   wherein the first connecting members are TSVs;
   a group of the first connecting members which is electrically equivalent or homologous transporting a same signal; and
   a contact area to realize an electric short circuit of the group of the first connecting members being electrically equivalent or homologous;
   wherein the contact area is electrically connected with at least one of the second connecting members thus realizing a scrambling between a number of the first connecting members and a number of the second connecting members.

2. The interposer of claim 1, comprising:
   a first face whereon the first connecting members are realized; and
   a second opposite face whereon the second connecting members are realized
   wherein the contact area is realized at the first face.

3. The interposer of claim 2, wherein the first connecting members are contact pads contacting microbumps of dies housed on the interposer.

4. The interposer of claim 1, wherein the contact area and the first connecting members of the group contacted by the contact area are realized inside the interposer.

5. The interposer of claim 1, further comprising routing metal tracks connecting the first connecting members to each other and to the second connecting members.

6. The interposer of claim 1, further comprising routing metal tracks connecting the contact area to additional first connecting members.

7. The interposer of claim 1, further comprising routing metal tracks connecting the contact area to the second connecting members.

8. The interposer of claim 1, further comprising routing metal tracks connecting the contact area to additional first connecting members and to the second connecting members.

9. The interposer of claim 1, wherein the contact area is made of a material chosen between a conductive material or a suitably doped semiconductor material.

10. The interposer of claim 1, comprising a plurality of contact areas.

11. The interposer of claim 1, wherein the contact area comprises and short-circuits a number of first connecting members equal to a scrambling ratio.

12. The interposer of claim 1, further comprising an additional integrated circuitry providing additional functionalities besides managing connections inside the interposer.

13. An integrated system comprising:
    a plurality of dies;
    an interposer;
    wherein the interposer houses the plurality of dies and comprises:
    a plurality of first connecting members and a plurality of second connecting members to be electrically connected to each other; wherein the first connecting members are in the same number and arrangement as respective connecting members of the plurality of dies;
    a group of the first connecting members which is electrically equivalent or homologous transporting a same signal; and
    a contact area to realize an electric short circuit of the group of the first connecting members being electrically equivalent or homologous
    the contact area being electrically connected with at least one of the second connecting members thus realizing a scrambling between a number of the first connecting members and a number of the second connecting members.

14. The integrated system of claim 13, wherein the interposer is a die and it comprises at least one area free from active circuitry to realize suitable connections with the at least one die housed on the interposer.

15. The integrated system of claim 13, further comprising a plurality of interposers.

16. A design method for designing an interposer for an integrated system comprising a first plurality of connecting members and a second plurality of connecting members to be electrically connected to each other, the method comprising the steps of:
    analysing an arrangement at least of the first connecting members of the interposer;
    identifying one or more groups of the first connecting members which are electrically equivalent or homologous transporting a same signal;
    realizing a contact area at a first group of the first connecting members, the contact area short-circuiting the first connecting members of the first group;
    wherein the step of realizing the contact area realizes a short circuit of TSVs realized inside the interposer; and
    providing at least one electric connection of the contact area with at least one of the second connecting members, thus realizing a scrambling between a number of the first connecting members and a number of the second connecting members.

17. The design method of claim 16, wherein the step of realizing the contact area realizes a short circuit of contact pads adapted to contact microbumps of dies housed on the interposer.

18. The design method of claim 16, wherein the step of assigning comprises a step of minimizing respective lengths of the connections and a number of intersections between the connections.

19. The design method of claim 16, wherein all the steps are repeated for more than one interposer in cascade.

20. The design method of claim 16, wherein the step of minimizing is of a concurrent type, so as to identify n shortest paths simultaneously.

21. The design method of claim 16, wherein the step of minimizing is of a sequential type, with optimization of a path at a time.

22. The design method of claim 16, wherein the step of assigning uses cost functions, determined on the basis of a graph theory to find minimum ways or paths on weighted graphs.

23. The design method of claim 16, wherein the step of assigning uses a hierarchical optimization algorithm, which takes into account all levels of an integrated system comprising at least one die housed on the interposer.

24. The design method of claim 16, further comprising a step of defining a shape and dimensions of the contact area so as to occupy a minimum surface adapted to ensure a contact with the first connecting members of the first group, wherein the contact area is defined with a rectangular or trapezoidal shape.

25. The design method of claim 24, wherein the step of defining the contact area comprising a step of generating at least one contact area with shape and dimensions bound by a technology used to realize the interposer, subsequently imposing a maximum number of connecting members contained therein.

26. The design method of claim 24, wherein the step of defining the contact area comprising a step of generating at least one contact area with shape and dimensions calculated starting from dimensions and arrangement of connecting members contained therein, based on a scrambling ratio.

* * * * *